C. W. DAKE.
STEAM TURBINE.
APPLICATION FILED JUNE 27, 1918. RENEWED MAR. 21, 1921.

1,377,755.

Patented May 10, 1921.

Witness.
Edward T. Wray.

Inventor.
Charles W. Dake.
by Parker & Carter
Attorneys.

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

STEAM-TURBINE.

1,377,755.     Specification of Letters Patent.     Patented May 10, 1921.

Application filed June 27, 1918, Serial No. 242,161. Renewed March 21, 1921. Serial No. 453,991.

*To all whom it may concern:*

Be it known that I, CHARLES W. DAKE, a citizen of the United States, residing at Chicago, in the county of Cook and State of Illinois, have invented a certain new and useful Improvement in Steam-Turbines, of which the following is a specification.

My invention relates to improvements in bearing caps for steam turbines and the like and has for one object to provide a new and improved form of bearing cap which will contain one of the ball bearings for the turbine shaft in place as a unit in such manner that the cap itself with the bearing may be removed thus exposing the whole side of the turbine without changing the adjustment of the bearing itself and leaving the parts in such position that they may be readily reassembled. Another object is to provide a new and improved form of closure for the open side of a steam turbine. Another object is to provide a new and improved form of adjustment and support for a ball bearing for shafts and the like.

My invention is illustrated more or less diagrammatically in the accompanying drawing wherein—

A is a turbine housing. Steam is adapted to be fed into it through a steam pipe $A^1$ and valve housing $A^2$ to drive the bucket wheel $A^3$. This housing A is preferably continuous on one side as shown and is closed on the other side by a removable diaphragm $A^4$ held in position by bolts $A^5$. $A^6$ is the turbine shaft upon which the rotor or wheel $A^3$ is mounted and with which it rotates. This shaft is supported at the motor end of the machine by bearings not here illustrated. The diaphragm $A^4$ is centrally apertured as indicated and this aperture is closed by a removable collar $A^7$ held in position by screws as indicated. This removable collar is interiorly screw-threaded as at $A^8$ and flanged as at $A^9$. The hub $A^{10}$ of the wheel projects outwardly through the collar just clearing the flange $A^9$. $A^{11}$ is a packing contained within the collar $A^7$ resting against the flange $A^9$ adapted to be compressed by the screw-threaded gland $A^{12}$ so as to make a steam tight joint between the ring $A^7$ and the hub. This gland is screw-threaded in the collar $A^7$ and is serrated as indicated and engaged by holding spring $A^{13}$ which holds it against rotation though, of course, the spring may be drawn out and rings applied for the necessary usual adjustment.

Figure 1:
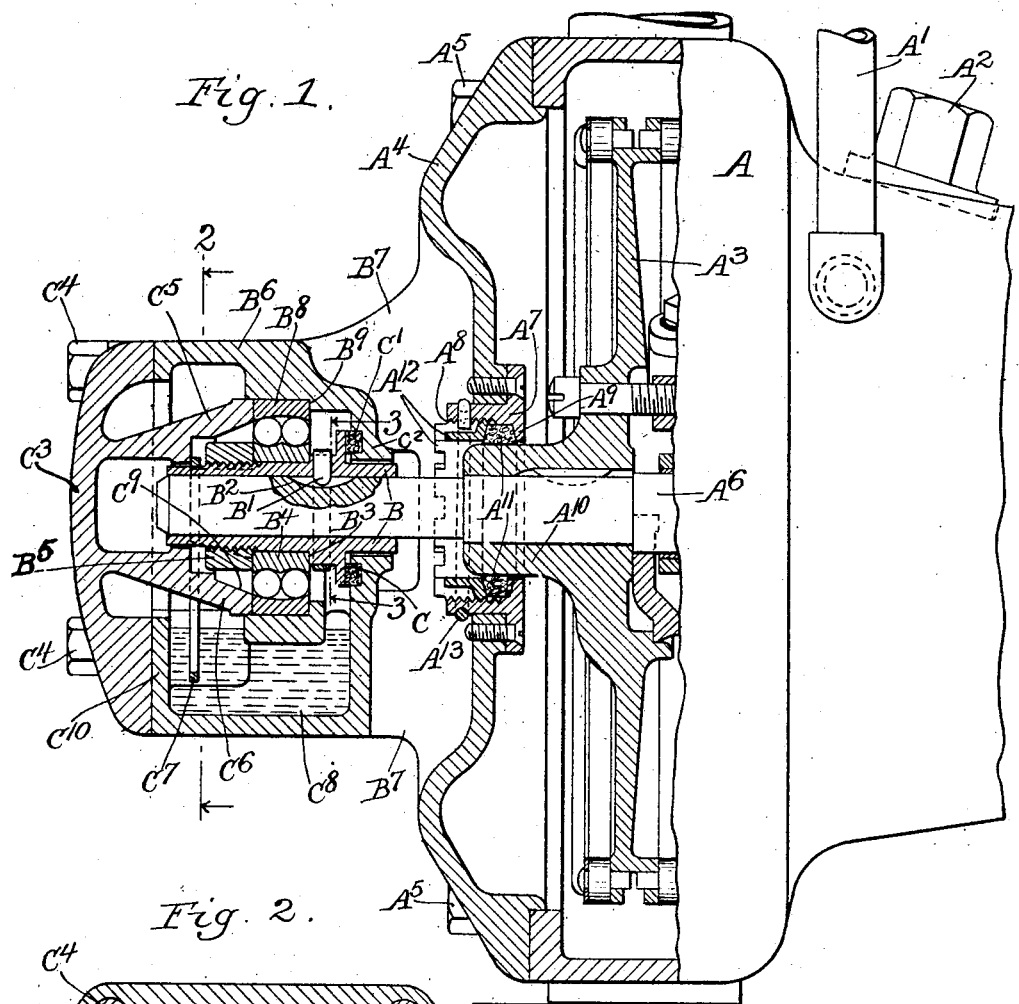
Figure 1 is a side elevation of a part of the turbine with part in section.
Figure 2:
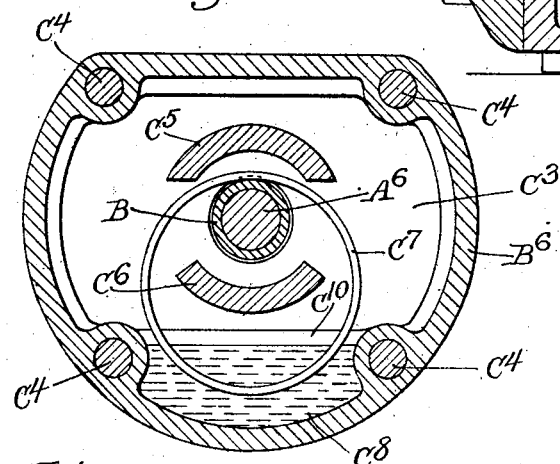
Fig. 2 is a section along the line 2—2 of Fig. 1.
Figure 3:
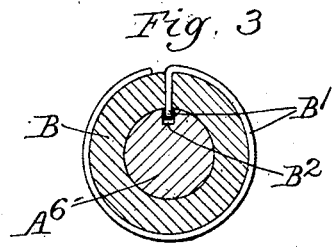
Fig. 3 is a detail section along the line 3—3 of Fig. 1.

The end of the shaft $A^6$ extends out beyond the diaphragm $A^4$ and is slidably mounted within a sleeve B. This sleeve is held against rotation on the shaft by a spring key $B^1$ projecting in through a perforation in the sleeve to engage a curved key seat $B^2$. The arrangement is such that when the parts are in the position shown in Fig. 1, the spring key snaps into the key seat and holds the seat in rotation with respect to the shaft. If you pull the sleeve longitudinally along the shaft, however, the inclined surface of the key seat will cause the spring key as it engages it to ride up until the key has left the key seat and thus the sleeve may be easily withdrawn. The sleeve B is shouldered as at $B^3$ and the inner race $B^4$ of the ball bearing is clamped against the shoulder by the nut $B^5$ on the sleeve B. $B^6$ is a bearing cap supported by arms $B^7$ on the diaphragm $A^4$. This bearing cap is bored out to engage the outer ball race $B^8$ of the shaft supporting ball bearings and is shouldered as at $B^9$ to engage such outer ball race.

The sleeve B is flanged as at C and this flange engages a felt packing $C^1$ in the wall $C^2$ of the bearing cap. A cover $C^3$ removable on the outer end of the bearing cap closes it, being held in position by bolts $C^4$. This cover has two segmental conical partition walls $C^5$ $C^6$ adapted to engage upper and lower sides of the ball race $B^8$ and clamp that ball race in position in the bearing cap. The reason why the members $C^5$ $C^6$ are segmental is to leave room for an oil ring $C^7$ which rides on the outer end of the sleeve B and carries oil up from the oil well $C^8$ in the bearing cap. This oil runs down the inclined surface $C^9$ to oil the ball bearing and a certain amount of oil, of course, works its way in between the sleeve and shaft to oil those parts so that sliding movement may take place when desired. The oil pocket $C^8$ is bounded on its outer side by the wall or dam $C^{10}$ so that when the cover $C^3$ is taken off the oil does not run out of the pocket and the bearing may be adjusted and parts removed or changed without losing oil. Clearances are such that the oil ring might bounce or jump out of its position and it is held where it belongs and stays there at all times. The only way you can get the oil ring out is by withdrawing the cap C³.

When it is desired to dismount the apparatus, the cap C³ can be drawn out and the bearing may be inspected or drawn off if need be or if the whole assembly is to be taken down you release the gland $A^{12}$, unscrew the screws $A^5$, and the whole diaphragm and bearing cap could be taken off thus exposing the whole inside of the turbine without in any way changing the adjustment of the ball bearing. Of course, the important thing is to make it possible to take down the machine without changing the adjustment of the ball bearing or without making it necessary to have expensive and expert help do the work.

It will be evident that while I have shown in my drawings an operative device, still many changes might be made both in size, shape and arrangement of parts without departing materially from the spirit of my invenion, and I wish, therefore, that my drawings be regarded as in a sense diagrammatic.

I claim:—

1. In a steam turbine a combined housing and supporting frame having an open side, equal in diameter to the diameter of the rotor, an apertured removable closure therefor adapted to be supported entirely upon the housing, a rotor within the housing, a rotor shaft projecting through the aperture and a bearing supported entirely upon the closure and separated from the steam containing passages and a packing interposed between the shaft and the aperture in the closure.

2. In a steam turbine a combined housing and supporting frame having an open side equal in diameter to the diameter of the rotor, an apertured removable closure therefor adapted to be supported entirely upon the housing, a rotor within the housing, a rotor shaft projecting through the aperture and a bearing supported entirely upon the closure and separated from the steam containing passages and a packing interposed between the shaft and the aperture in the closure, bearing supporting members projecting from the housing spaced around the shaft and all of them rigidly supporting the bearing.

3. In a steam turbine a combined housing and supporting frame having an open side, equal in diameter to the diameter of the rotor, an apertured removable closure therefor adapted to be supported entirely upon the housing, a rotor within the housing, a rotor shaft projecting through the aperture and a bearing supported entirely upon the closure and separated from the steam containing passages and a packing interposed between the shaft and the aperture in the closure, the bearing being supported entirely upon the closure independent of and out of contact with the housing itself.

4. In a steam turbine a combined housing and supporting frame having an open side equal in diameter to the diameter of the rotor, an apertured removable closure therefor adapted to be supported entirely upon the housing, a rotor within the housing, a rotor shaft projecting through the aperture and a bearing supported entirely upon the closure and separated from the steam containing passages and a packing interposed between the shaft and the aperture in the closure, the bearing being supported entirely upon the closure independent of and out of contact with the housing itself, bearing supporting members projecting from the housing spaced around the shaft and all of them rigidly supporting the bearing.

In testimony whereof, I affix my signature in the presence of two witnesses this 10th day of June, 1918.

CHARLES W. DAKE.

Witnesses:
MINNIE M. LINDENAU,
MARIAN L. INGRAHAM.